United States Patent Office 3,433,066
Patented Mar. 18, 1969

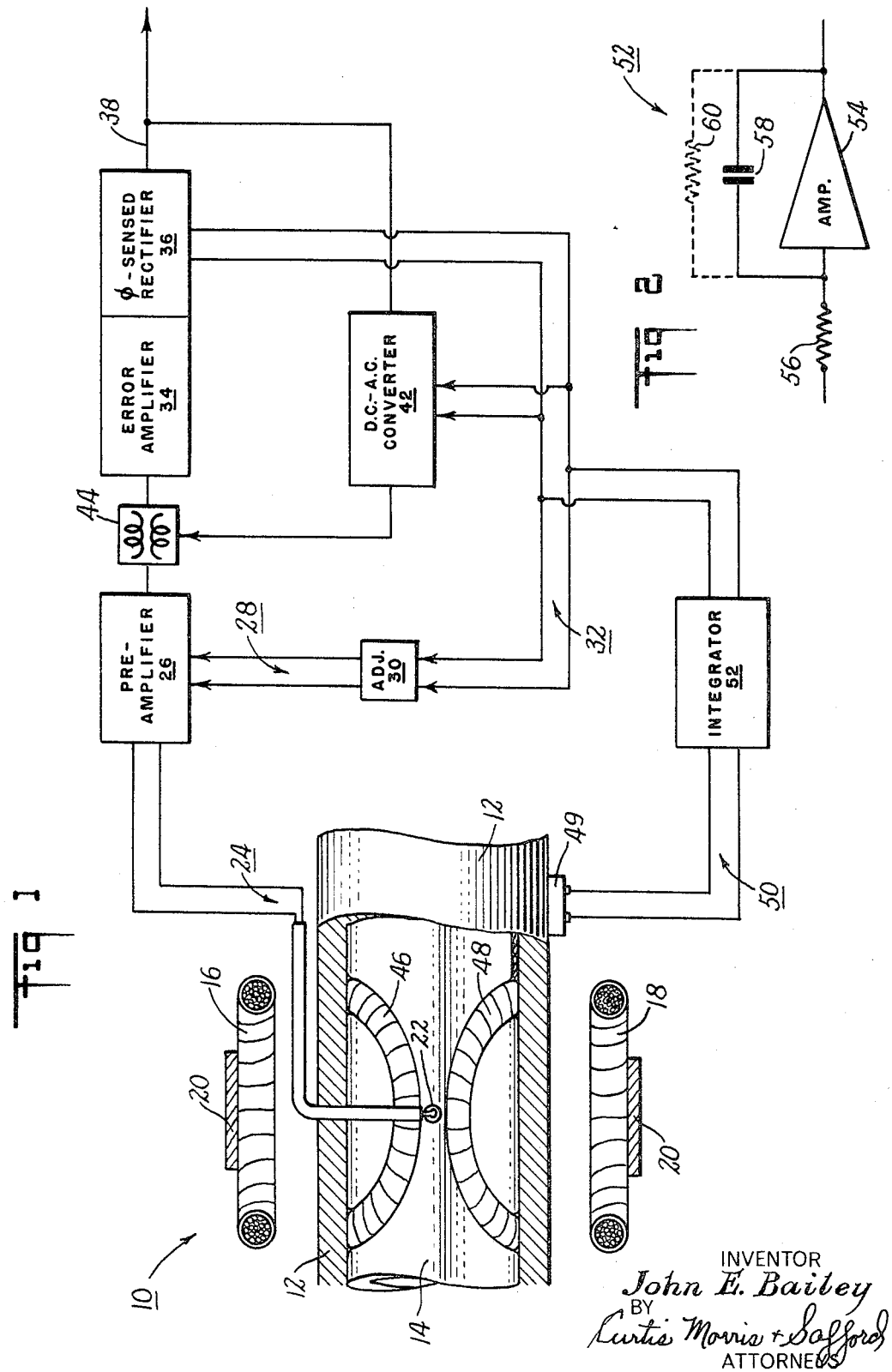

3,433,066
MAGNETIC FLOWMETER APPARATUS
John E. Bailey, Needham, Mass., assignor to
The Foxboro Company, Foxboro, Mass.
Filed Oct. 3, 1966, Ser. No. 583,710
U.S. Cl. 73—194
Int. Cl. G01f 1/04
5 Claims

ABSTRACT OF THE DISCLOSURE

An A-C magnetic flowmeter comprising a pair of magnetizing coils on opposite sides of a flow pipe and electrodes in the wall of the flow pipe to develop a flow voltage corresponding to the rate of flow. The flow voltage is compared with a reference signal developed by a pickup coil aligned with the magnetizing coil to encompass all of the flux passing through the flow pipe across the full width thereof. The voltage induced in the pickup coil is directed to an integrator circuit to produce the reference signal with a magnitude proportional to the actual instantaneous magnitude of the flux, regardless of changes in the flux due to the line voltage variations, magnetic inhomogeneities in the liquid being measured, or other causes.

This invention relates to flow measuring apparatus. More particularly, this invention relates to an improved magnetic flowmeter for developing a signal corresponding to the rate of flow of a fluid.

In a conventional magnetic flowmeter, a pair of magnetizing coils are mounted on opposite sides of the flow pipe and are energized with alternating current so as to produce in the fluid within the pipe an alternating magnetic field at right angles to the direction of fluid movement. The pipe wall is pierced by a pair of electrodes adapted to detect the A-C electrical voltage generated by the fluid movement through the magnetic flux. This voltage is in phase with the flux of the magnetic field, and the voltage amplitude is proportional to the fluid flow rate. The A-C flow signal thus developed is directed by suitable leads to an amplifier the output of which typically is used to actuate a chart recorder, or other form of visual indicator, in accordance with the signal amplitude.

As is well known, the amplitude of the A-C supply voltage ordinarily can be expected to change from time to time. This causes a corresponding change in amplitude of the magnetic flux and, in turn, a corresponding change in amplitude of the flow signal, even though there has been no actual change in flow rate. Thus, if no steps were taken to compensate for this effect, an error in meter reading would result.

To minimize measurement errors from this effect, it has been the usual practice to furnish the flowmeter amplifier with a "reference signal," proportional to the A-C energization of the magnetizing coils, for comparison with the flow signal. By use of suitable comparison circuitry, changes in flow signal produced by changes in supply voltage can be substantially eliminated from the final flow indication. For example, the amplifier typically will include circuitry to detect the ratio of the flow signal to the reference signal, and to produce an output proportional to this ratio. Thus, changes in the flow signal which are due to changes in the supply voltage should not affect the final output of the amplifier.

Several different approaches have been used for developing such a reference signal. Perhaps the simplest is that of tapping off an appropriate amount of voltage from the A-C supply line. Since the phase of the flux in the pipe (and hence the phase of the flow signal) is displaced approximately 90° from that of the supply line voltage, the reference signal tapped from the supply line has been fed through a phase-shifting device in order to effect a phase match with the generated flow signal.

Still another approach is to develop a reference voltage proportional to the magnitude of current flowing in the magnetizing coil, as shown for example in U.S. Patent 2,729,103. It also has been proposed to develop a reference signal by coupling a winding to the core of the magnetizing winding, as shown fro example in U.S. Patent 2,757,538.

It has been found that none of these various prior techniques provides a reference signal which accurately reflects all of the effects on the flow signal of changes in amplitude and frequency of the magnetic flux within the flowing fluid. Thus, with such prior arrangements, a change in flow signal due, for example, to noise in the A-C supply line, or to a variation in the magnetic properties of the fluid, would not always be completely compensated for by a corresponding change in the reference signal. Consequently, the reading of the flowmeter could be in error, sometimes by an unacceptable amount.

It is an object of this invention to provide improved magnetic flowmeter apparatus. A more specific object of the invention is to provide a magnetic flowmeter with unique means for more accurately compensating for fluctuations in flow signal not due to changes in fluid flow rate. Other objects, aspects and advantages of the invention will in part be pointed out in, and in part apparent from, the following description of a preferred embodiment of the invention.

In the apparatus to be described, a reference signal is derived from the induced voltage of a pickup coil which is so arranged that it encompasses substantially all of the magnetic flux passing through the pipe wall into the fluid being measured. Thus, any change in the amplitude or frequency of this flux, regardless of its cause, will be reflected by a corresponding change in the induced voltage of the pickup coil.

The reference signal is created from this induced voltage by integration. That is, the output of the reference signal pickup coil is coupled to an electronic intgerating device which produces a signal corresponding to the time-integral of the voltage induced in the pickup coil. Since the induced coil voltage is proportional to the rate-of-change of flux, integration of that voltage produces an output which is proportional to the actual instantaneous magnitude of the flux. Thus, this reference signal is capable of serving as an accurate reference base for comparison with the flow signal derived from the A-C voltage generated by the movement of fluid through the flux, because that flow generated voltage also is proportional to the actual instantaneous magnitude of flux, not its rate-of-change.

FIGURE 1 of the drawings forming part of this disclosure is a schematic diagram, partly in block form, showing the major parts of a magnetic flowmeter system incorporating this invention. FIGURE 2 is a schematic diagram of an electronic integrator useful in carrying out the invention.

Referring now to FIGURE 1, there is shown a flow head generally indicated at 10 and including a composite pipe section comprising an outer section, in the form of a rigid tube 12 (e.g., stainless steel), and an inner section consisting of an insulating liner 14 (e.g., plastic). Magnetic flux is developed within the fluid flowing through the pipe section by means of a pair of magnetizing coils 16 and 18 disposed above and below the pipe, and surrounded by the usual band of magnetic material 20 to provide a low reluctance return path for the flux. These coils are energized by the A-C supply line (typically 60 c.p.s.) to produce alternating flux within the interior of the pipe. Details of a somewhat comparable flux-producing arrangement are set forth in U.S. Patent 3,006,188.

Extending through opposite sides of the flow pipe are respective electrodes 22 adapted to detect the A-C voltage generated by movement of the fluid through the magnetic field. These electrodes are connected by the usual shielded leads 24 to provide an A-C flow voltage to the input of a preamplifier generally indicated by a block 26.

This preamplifier 26 may include conventional circuit means for injecting into the flow signal circuit an A-C zeroing voltage in series with respect to the flow voltage developed by flow head 10. This zeroing voltage is coupled by leads 28 from a conventional amplitude and phase adjustment network 30 energized by a pair of reference signal leads 32. The zeroing voltage is adjusted in amplitude and phase by network 30 so as to cancel any line-frequency signal appearing on flow signal leads 24 when there is no fluid movement in the pipe. The magnitude of this zeroing voltage typically will be quite small, e.g., only a few microvolts or so.

The A-C output of the preamplifier 26 is directed to an error amplifier 34 the last stage of which comprises a phase-sensed rectifier 36. This rectifier, which may for example be generally comparable to that shown in U.S. Patent 3,131,560, receives a phase reference signal from leads 32 and operates to produce in the amplifier output circuit 38 a D-C signal having a magnitude corresponding to the amplitude of the A-C flow signal. To this end, the error amplifier is provided with a feedback circuit which includes a conventional D-C to A-C converter 42 to develop an A-C feedback signal corresponding to the D-C output. This A-C feedback signal is connected (as by means of a transformer indicated symbolically at 44) in opposition to the flow signal received from the preamplifier 26.

The converter 42 is energized from the reference signal leads 32, and the A-C feedback signal it produces is essentially a duplicate of the A-C reference signal on leads 32 but modulated in amplitude in accordance with the D-C signal in the amplifier output circuit 38. In effect, the converter 42 serves as a "multiplier" to produce an A-C feedback signal which represents the product of the A-C reference signal and the D-C output signal. It may be noted that the reference signal used for converter 42 is the same as that used for the phase-sensed rectifier 36 and the zeroing voltage network 30.

The common reference signal on leads 32 is derived basically from a pair of multiple-turn pickup coils 46 and 48 positioned between the plastic inner liner 14 and the rigid outer tube 12 of the flow pipe. These pickup coils are secured in position around the inner liner in a location to encompass at least substantially all of the flux passing into the flowing fluid from the magnetizing coils 16 and 18. The pickup coils are arranged in a configuration which, as seen in plan view, is aligned symmetrically with the "window" of the magnetizing coils. Preferably this configuration is at least approximately the same as that of the magnetizing coils, and may, for example, have an oval outline. The pickup coils also advantageously extend a substantial distance circumferentially around the pipe, e.g., such that diametrically opposite portions of each coil are closely adjacent the electrodes 22.

The voltages induced in these pickup coils 46 and 48 are coupled together (by conventional connecting lead wires, not shown) to an external terminal block 49. From the terminals of block 49, the induced A-C voltage is directed through a pair of leads 50 to an electronic integrating device, shown schematically by block 52. This device may be any conventional precision electronic integrator, and comprises circuitry, including amplification means where appropriate, to produce an output signal corresponding to the time-integral of its input signal. A suitable integrator is shown in FIGURE 2, and includes a high-gain amplifier 54 having a series input resistor 56 and a feedback capacitor 58. To avoid zero drift effects, a resistor 60 may be connected in parallel with the feedback capacitor, but the parameters are selected so that the phase shift at line frequency (e.g., 60 c.p.s.) and higher harmonics thereof is essentially 90°, thereby to provide true integrating action for the signal derived from the pickup coils.

Since the voltage induced in the pickup coils 46 and 48 is proportional to the rate-of-change of the flux passing through the fluid, the output of the integrating device 52 will correspond to the actual magnitude of the flux. This correspondence with the actual flux will be maintained under conditions of changing flux amplitude (e.g., due to line voltage fluctuations) and also in the face of flux frequency variation effects, such as line frequency shifts and transient impulses resulting from noise on the line or from external sources. It also will be evident that changes in flux resulting from variations in the magnetic properties of the flowing fluid will produce corresponding changes in the reference signal on leads 32, becaus this reference signal is derived basically from the actual flux passing through the fluid.

Thus essentially any variation in the flow signal resulting from a change in flux passing through the fluid will be matched by a corresponding variation in the reference signal on leads 32. As described above, this reference signal is coupled into the flow signal circuit so as to tend to oppose the flow signal, and thus the matching variations in flow signal and reference signal cancel one another. In effect, the variations due to changes in flux are "divided out" of the flow signal, so as to produce a net output signal which is effectively responsive purely to fluid flow rate.

In the present embodiment, the reference signal is coupled into the flow signal circuit in three separate places (26, 36 and 44), and the overall cancellation effect produced by the reference signal is a composite of the signal cancellations at the three coupling points. Typically, a major part of the cancellation will occur in the feedback connection 44 at the input of the error amplifier 34, but the cancellation effects at the preamplifier 26 and the phase-sensed rectifier 36 also aid in providing the desired accurate output signal.

Although a preferred embodiment of the invention has been described herein in detail, it is desired to emphasize that this disclosure is not intended to be exhaustive or necessarily limiting. For example, effective results also can be achieved by passing the A–C flow signal through a true derivative circuit, and eliminating the integrating device 52. The so-altered flow signal will be proportional to the rate-of-change of flux, as is the reference signal induced in the pickup coils 46 and 48, and thus the flow and reference signals will be suited for comparison in the amplifier circuitry. This modified arrangement produces, as does the basic arrangement, flow and reference signals which might be said to be of the same time-function-domain with respect to the originating magnetic flux.

Accordingly, it should be understood that the showing herein is for the purpose of illustrating the invention so as to enable others skilled in the art to adapt the inventionin such ways as meet the requirements of particular applications, it being recognized that various modifications may be made without departing from the scope of the invention as limited by the prior art.

I claim:

1. In magnetic flowmeter apparatus of the type having a magnetizing coil energized by an A-C supply to produce an A-C magnetic field in the fluid being measured, means including electrode means in contact with said fluid to produce a flow-responsive A-C voltage corresponding to the rate of fluid movement, circuit means coupled to said electrode means to develop a flow signal corresponding to said A-C flow voltage, and means for developing an A-C reference signal corresponding to the energization of said magnetizing coil to be coupled to said circuit means together with said flow signal to effect a comparison between said two signals;

that improvement in said apparatus wherein said means for developing a reference signal comprises a pickup coil positioned adjacent said A-C magnetic field to develop an induced A-C voltage in accordance with the rate-of-change of magnetic flux passing therethrough, said induced A-C voltage serving as the basis for said reference signal, said magnetizing coil being mounted adjacent a pipe section carrying the fluid being measured, said pickup coil being positioned to surround at least substantially all of the flux passing through said pipe section from said magnetizing coil, said pickup coil being shaped to match at least approximately the surface contour of said pipe section, said pipe being provided on its interior with an insulating liner with said pickup coil being located between said liner and the inner surface of said pipe; and time-function means having an input and an output with one of said A-C voltages being coupled to said input to produce at said output a corresponding one of said signals for said comparison with the other of said signals, said time-function means including means to produce said one signal in the same time-function-domain with respect to said flux as said other signal, thereby to place said two signals on a properly comparable basis.

2. In magnetic flowmeter apparatus of the type having a pipe section carrying a fluid to be measured, a magnetizing coil alongside said pipe section and separated therefrom by an air-gap, said coil being energized by an A-C supply to produce an A-C magnetic field across said air-gap and in the fluid being measured, said coil being formed with a wide central opening so that the flux covers a region extending the full width of the pipe section, a pair of electrode means to sense the A-C voltage generated by the fluid movement, circuit means coupled to said electrode means to operate on the flow signal produced thereby, said circuit means including amplifier means to produce an intensified flow signal, and means for developing an A-C reference signal corresponding to the energization of said magnetizing coil to be coupled to said circuit means together with said flow signal; said reference signal means comprising a pickup coil near the end of said air-gap immediately adjacent said pipe section and coupled to said A-C magnetic field to develop an induced voltage to serve as the basis for said reference signal, said pickup coil having a wide central opening aligned with the central opening of said magnetizing coil and extending the full width of the pipe section, thereby to encompass at least substantially all of the flux passing from said magnetizing coil through said air-gap and extending across the full width of said pipe section.

3. Apparatus as claimed in claim 2, wherein said pipe section is circular in cross-section, said electrode means being at diametrically opposite points around said pipe section, said pickup coil as seen in plan outline having a configuration matching the magnetizing coil aligned therewith and with the central openings thereof effectively overlying each other, said pickup coil being symmetrically positioned about said electrode means, diametrically opposite portions of said pickup coil being located next to said electrode means respectively.

4. In magnetic flowmeter apparatus of the type having a pipe section of circular cross-section carrying a fluid to be measured, a magnetizing coil alongside said pipe section and separated therefrom by an air-gap, said coil being energized by an A-C supply to produce an A-C magnetic field across said air-gap and in the fluid being measured, a pair of electrode means at diametrically opposite points around said pipe section to sense the A-C voltage generated by the fluid movement, circuit means coupled to said electrode means to operate on the flow signal produced thereby, said circuit means including amplifier means to produce an intensified flow signal, and means for developing an A-C reference signal corresponding to the energization of said magnetizing coil to be coupled to said circuit means together with said flow signal; that improvement in said apparatus wherein said reference signal means comprises a pickup coil near the end of said air-gap immediately adjacent to said pipe section and coupled to said A-C magnetic field to develop an induced voltage to serve as the basis for said reference signal, the pickup coil being shaped to match the outer contours of said pipe section and to encompass at least substantially all of the flux passing through said air-gap and into said pipe section from said magnetizing coil, said pickup coil being approximately circular as seen in plan outline and symmetrically positioned about said electrode means, diametrically opposite portions of said pickup coil being located next to said electrode means respectively, said pipe section comprising an outer rigid tube and a close-fitting inner liner, said pickup coil being located between said rigid tube and said inner liner.

5. Magnetic flowmeter apparatus of the type having a magnetizing coil energized by an A-C supply to produce an A-C magnetic field in the fluid being measured, means including electrode means in contact with said fluid to produce a flow-responsive A-C voltage corresponding to the rate of fluid movement, circuit means including a preamplifier coupled to said electrode means to develop a flow signal corresponding to said A-C flow voltage, means for developing an A-C reference signal corresponding to the energization of said magnetizing coil, comparison means for comparing a voltage derived from said reference signal with the flow signal from the output of said preamplifier; an amplifier having its input coupled to said comparison means to receive a signal reflecting the results of the comparison; phase-sensed rectifier means at the output of said amplifier; means for coupling to said rectifier means a phase-sensing signal derived from said A-C reference signal to develop a D-C output signal representing flow rate; said means for developing a reference signal comprising a pickup coil positioned adjacent said A-C magnetic field to develop an induced A-C voltage in accordance with the rate-of-change of magnetic flux passing therethrough, said induced A-C voltage serving as the basis for said reference signal; time-function means for placing said reference signal and said flow signal in the same time-function-domain with respect to said flux, to permit proper comparison therebetween; circuit means for supplying to said preamplifier an A-C zeroing voltage to cancel any line frequency signal appearing on the connecting leads when there is no fluid movement; means for energizing said circuit means from said A-C reference signal derived from said pickup coil; and means forming part of said circuit means to provide a properly phased zeroing voltage for said preamplifier.

References Cited
UNITED STATES PATENTS

| | | | |
|---|---|---|---|
| 3,002,383 | 10/1961 | Mittelmann | 73—194 |
| 3,274,831 | 9/1966 | Cushing | 73—194 |
| 3,316,762 | 5/1967 | Westersten | 73—194 |

FOREIGN PATENTS 834,011   5/1960   Great Britain.

RICHARD C. QUEISSER, *Primary Examiner.*

CHARLES A. RUEHL, *Assistant Examiner.*

U.S. Cl. X.R.

330—15, 22